United States Patent Office 3,517,051
Patented June 23, 1970

3,517,051
PHENOXY SUBSTITUTED PHENYLACETIC ACIDS
William A. Bolhofer, Frederick, Pa., assignor to Merck & Co., Inc., Rahway, N.J., a corporation of New Jersey
No Drawing. Continuation-in-part of application Ser. No. 429,107, Jan. 29, 1965, which is a continuation-in-part of application Ser. No. 353,579, Mar. 20, 1964. This application Oct. 3, 1966, Ser. No. 583,940
Int. Cl. C07c 65/00, 69/76, 103/26
U.S. Cl. 260—473       14 Claims

ABSTRACT OF THE DISCLOSURE (Phenoxy)phenylacetic acid products and the salts, esters and amide derivatives thereof, wherein the phenoxy nucleus is substituted by a single moiety and the phenyl ring may be optionally substituted by one or two nuclear substituents. The instant products are prepared by treating an alkali metal salt of an appropriately substituted phenol with an ester of a phenylhaloacetic acid to afford a (phenoxy) phenylacetic acid ester which, if desired, may be hydrolyzed to the desired acid by treatment with an aqueous solution of a base and then with an acid to afford the corresponding (phenoxy)phenylacetic acid product. The products of the process reduce the concentration of cholesterol and other lipids in blood serum.

This application is a continuation-in-part of copending U.S. application Ser. No. 429,107, filed Jan. 29, 1965, now abandoned which in turn is a continuation-in-part of copending U.S. application Ser. No. 353,579, filed Mar. 20, 1964, now abandoned.

It is an object of this invention to describe a new class of chemical compounds which can be characterized generally as (phenoxy)phenylacetic acids and, also, the nontoxic, pharmacologically acceptable salts, lower alkyl ester and amide, lower alkylamide, di-lower alkylamide, hydroxyamide and heterocyclic amide derivatives thereof.

Also, it is an object of this invention to describe a novel method of preparation for the instant (phenoxy)phenylacetic acids, their salts, esters and amides.

Clinical studies show that cholesterol apparently plays a major role in the formation of atherosclerotic plaques by accelerating the deposition of blood lipids in the arterial wall. It is the purpose of this invention to disclose a new class of chemical compounds which effectively reduces the concentration of cholesterol and other lipids in blood serum and thus ameliorates the condition usually associated with blood lipid deposition.

The products of this invention are compounds having the following general formula:

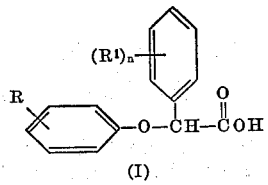

(I)

wherein R is lower alkenyl, for example, vinyl, allyl, etc., halomethyl, for example, chloromethyl, etc., trihalomethyl, for example, trifluoromethyl, etc., lower alkanoyl, for example, acetyl, propionyl, butyryl, etc., aryl, for example, mononuclear aryl such as phenyl, tolyl, xlyly, etc., aralkyl, for example, mononuclear aralkyl such as benzyl, phenethyl, etc., aralkenyl, for example, mononuclear aralkenyl such as styryl, 3-phenyl-1-propenyl, etc., aryloxy, for example, mononuclear aryloxy such as phenoxy, etc., aralkoxy, for example, mononuclear aralkoxy such as benzyloxy, etc., arylthio, for example, mononuclear arylthio such as phenylthio, etc., arylamino, for example, mononuclear arylamino such as anilino, toluidino, etc., carboxy, lower alkylthio, for example, methylthio, ethylthio, etc., lower alkylsulfonyl, for example, methylsulfonyl, ethylsulfonyl, etc., cyano, nitroso, amino, mono- and di-alkylamino, for example, mono- and di-lower alkylamino such as ethylamino, dimethylamino, diethylamino, etc.; $R^1$ represents similar or dissimilar members selected from hydrogen, halogen, lower alkyl, halomethyl, for example, chloromethyl, etc., lower alkoxy, for example, methoxy, ethoxy, etc., lower alkanoyl, for example, acetyl, propionyl, butyryl, etc., aryl for example, mononuclear aryl such as phenyl, tolyl, xylyl, etc., aralkyl, for example, mononuclear aralkyl such as benzyl, phenethyl, etc., aryloxy, for example, mononuclear aryloxy such as phenoxy, etc., aralkoxy, for example, mononuclear aralkoxy such as benzyloxy, etc., cyano, carboxy, and lower alkylsulfonyl,, for example, methylsulfonyl, ethylsulfonyl, etc.; and n is an integer having a valve of 1 to 2; and the acid addition salts thereof derived from a base having a nontoxic, pharmacologically acceptable cation. In general, any base which will form an acid addition salt with a carboxylic acid and whose pharmacological properties will not cause an adverse physiological effect when ingested by the body system is considered as being within the scope of this invention. Suitable bases thus include, for example, the alkali metal alkoxides such as sodium methoxide, etc. and the alkali metal and alkaline earth metal hydroxides, carbonates, bicarbonates, etc., such as sodium hydroxide, potassium hydroxide, calcium hydroxide, potassium carbonate, sodium bicarbonate, magnesium carbonate, etc. Also, the alumnium salts of the instant products (I) may be obtained by treating the corresponding sodium salt with an appropriate aluminum complex such as aluminum chloride hexahydrate, etc. The acid addition salts thus obtained are the functional equivalent of the corresponding (phenoxy)-phenylacetic acid products (I) and one skilled in the art will appreciate that, to the extent that the instant carboxylic acids (I) are useful in therapy, the variety of acid addition salts embraced by this invention are limited only by the criterion that the bases employed in forming the salts be both nontoxic and physiologically acceptable.

This invention also relates to the ester and amide derivatives of the instant carboxylic acid products (I), which derivatives are prepared by conventional methods well known to those skilled in the art. Thus, for example, the ester derivatives may be prepared by the reaction of a (phenoxy)phenylacetic acid (I) with an alcohol as, for example, with a lower alkyl alcohol in the presence of a suitable catalyst as, for example, in the presence of sulfuric acid, boron trifluoride etherate, dry hydrogen chloride gas, etc. or, alternatively, the (phenoxy)phenylacetic acid (I) may be converted to its acid halide by conventional methods and the acid halide thus formed may be reacted with an appropriate lower alkanol. The desired ester derivatives of this invention may also be prepared inherently by employing, in the process hereinafter disclosed for the preparation of the instant, products, the appropriate ester of the phenylhaloacetic acid reactant (II, infra). The amide derivatives of the instant (phenoxy)phenylacetic acids may be prepared by treating the acid halide of the said products with ammonia, an hydroxylamine, or with an appropriate monoalkylamine, dialkylamine or heterocyclic amine such as pyrrolidine, piperidine, morpholine, etc. to produce the corresponding amide. Still another process for preparing the said amide derivatives comprises converting an ester derivative of a (phenoxy)phenylacetic acid (I) to its corresponding amide by treating the said ester with ammonia, hydroxylamine, or with an appropriate monoalkylamine, dialkylamine or heterocyclic amine to produce the corresponding amide derivative. These and other equivalent methods for the preparation of the ester and amide derivatives of the instant products will be apparent to those having ordinary skill in the art and, to the extent that the said derivatives are both nontoxic and physiologically acceptable to the body system, the said esters and amides are the functional equivalent of the corresponding (phenoxy)phenylacetic acid products (I).

A preferred embodiment of this invention relates to (phenyoxy)phenylacetic acids having the following general formula:

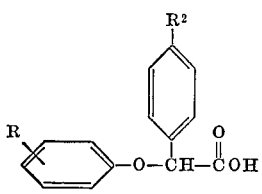

wherein R is trifluoromethyl and $R^2$ is halogen, for example, chlorine, bromine, etc. Also included within the preferred embodiment are the nontoxic, pharmacologically acceptable acid addition salts, lower alkyl ester and amide, monoalkylamide, dialkylamide and hydroxyamide derivatives of the (phenoxy)phenylacetic acid products described above. The foregoing class of compounds exhibits particularly good hypocholesterolemic activity and represents a preferred subgroup of compounds within the scope of this invention.

The products of this invention contain an asymmetric carbon atom at the alpha carbon of the (phenoxy)phenylacetic acid molecule and, therefore, are obtained as racemic mixtures of their dextro and laevorotatory isomers, which can be separated by crystallization of their salts with optically active bases. It is to be understood that the said dextro and laevo isomers are embraced within the scope of this invention.

The (phenoxy)phenylacetic acids (I) of this invention are conveniently prepared by the reaction of an alkali metal salt of an appropriately substituted phenol with an hydrocarbyl ester of a phenylhaloacetic acid (II, infra), followed by the hydrolysis of the (phenoxy)phenylacetic acid ester intermediate (III, infra) thus formed by treatment with an aqueous solution of a base and then with an acid. By "hydrocarbyl" is meant, a monovalent organic radical composed solely of carbon and hydrogen, for example, a lower alkyl radical such as methyl, ethyl, propyl, etc. Suitable bases and acids which may be used in the hydrolysis step include, for example, sodium hydroxide, potassium carbonate, etc, and inorganic acids such as hydrochloric acid, etc. The following equation illustrates this method of preparation:

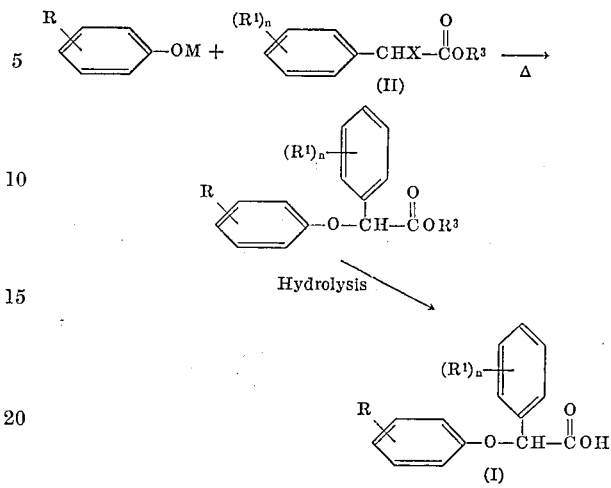

wherein R, $R^1$ and $n$ are as defined above, M is an alkali metal cation, for example, the cation derived from an alkali metal alkoxide, such as sodium alkoxide, etc.; $R^3$ represents an hydrocarbyl radical, for example, a lower alkyl radical, such as methyl, ethyl, etc.; and X represents halogen, for example, chlorine, bromine, etc. Preferably, the reaction of the alkali metal salt of the phenol with the phenylhaloacetic acid ester (II) is conducted with heating as, for example, by heating on a steam bath for periods of from two to about twenty hours; however, it is to be understood that the application of heat merely facilitates the reaction and, in general, is not strictly necessary to the success of the process.

The phenylhaloacetic acid esters (II) employed as starting materials in the foregoing synthesis are conveniently prepared by the reaction of an appropriate phenylacetic acid (IV, infra) with thionyl chloride to produce the corresponding phenylacetic acid halide (V, infra); treating the said acid chloride (V) thus formed with a suitable halogenating agent such as bromine, chlorine, etc., to produce the appropriate phenylhaloacetic acid chloride (VI, infra); and then treating the said phenylhaloacetic acid chloride (VI) with an alcohol as, for example, with methanol, ethanol, etc., to obtain the corresponding phenylhaloacetic acid ester (II). The following equation illustrates this method of preparation:

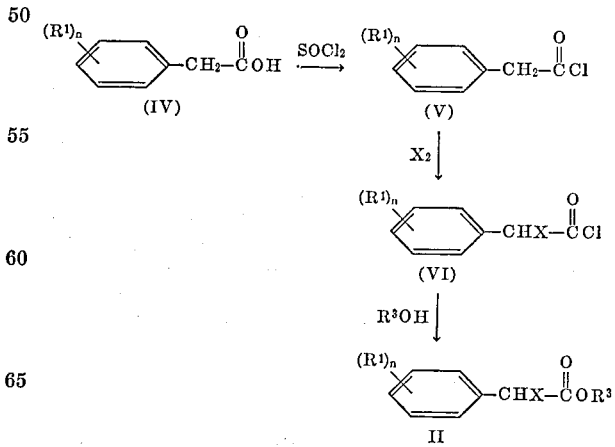

wherein $R^1$, $R^3$, X and $n$ are as defined above; $X_2$ is an halogenating agent such as chlorine, bromine, etc.; and $R^3OH$ represents an alcohol such as methanol, ethanol, etc.

There is no clear agreement about the actual role of cholesterol synthesis in the localization of atherosclerotic plaques, but numerous studies support the concept that cholesterol plays a major role in the pathogenesis of atherosclerosis because along with other lipids and fibrin it is the substance that accumulates in the arterial intima and subintima and produces arterial corrosion.

Since cholesterol is present to some extent in all ordinary diets and since it is also synthesized by various body organs from intermediates of metabolic origin, the development of some chemotherapeutic agent which will induce a significant reduction in the serum cholesterol level has been found desirable. To this end the (phenoxy) phenylacetic acids (I) of this invention were synthesized and tested and found to exhibit good hypocholesterolemic activity. Thus, in a comparison with other known compounds, the instant products compare most favorably in protecting against induced hypercholesterolemia and combine the unexpected advantage of low toxicity with little or no undesirable side effects. Furthermore, the products of this invention have shown themselves to be metabolically more acceptable than many other chemotherapeutic agents used in the treatment of atherosclerosis and may be taken orally as part of a diet with good ingestion by the body system. For this purpose the compounds of this invention may be administered in the form of a pharmacologically acceptable acid addition salt and in admixture width a pharmaceutical carrier.

In addition to their pharmacological activity, the (3-trifluoromethylphenoxy)(4-halophenyl)acetic acid products (I) of this invention are useful as intermediates in preparing the ester and amide derivatives described and claimed in applicant's copending application Ser. No. 583,937, filed of even date. The said (3-trifluoromethylphenoxy)(4-halophenyl)acetic acid esters and amides also exhibit hypochlesterolemic activity and, therefore, are also useful in the treatment of conditions associated with blood lipid deposition.

The examples which follow illustrate the (phenoxy)-phenylacetic acids (I) of this invention and the salts, esters and amide derivatives thereof, and the methods by which they are prepared. However, the examples are illustrative only and it will be apparent to those having ordinary skill in the art that all of the product embraced by Formula I, supra, may be prepared in an analogous manner by substituting the appropriate starting materials for those set forth in the examples.

EXAMPLE 1

(3-trifluoromethylphenoxy)(4-chlorophenyl)acetic acid

Step A: 4-chlorophenylacetic acid.—4-chlorophenyl-acetonitrile (151.5 g., 1.0 mole) and 1 liter of 20% aqueous sodium hydroxide are mixed and heated on a steam bath with stirring for 20 hours. The resulting solution is cooled and extracted with ether to remove a small amount of oily material. The aqueous solution then is acidified with concentrated sulfuric acid and cooled to 5° C. The crystalline product is collected, washed with water, dried and recrystallized from 700 ml. of 70% ethanol to yield 165 g. (97%) of 4-chlorophenylacetic acid, M.P. 103–105° C.

Step B: Methyl (4-chlorophenyl)bromoacetate.—4-chlorophenylacetic acid (170 g., 1.0 mole) and thionyl chloride (150 g., 1.25 mole) are placed in a 2-liter flask fitted with a stirrer, reflux condenser and dropping funnel. The mixture is stirred and heated at reflux for two hours with stirring while bromine (160 g., 1.0 mole) is added from the dropping funnel over a three-hour period. Heating under reflux is continued for 20 hours. The reaction mixture then is cooled to room temperature and methyl alcohol (1 liter) is added, slowly at first, and then more rapidly as the initial exothermic reaction subsides. The excess methanol is evaporated in vacuo and the residue is treated with water. Ether is used to extract the product and the extract is dried over magnesium sulfate and distilled. There is thus obtained 212 g. (80%) of methyl (4-chlorophenyl)bromoacetate as a colorless oil, B.P. 96–100° C./1 mm.

Step C: Methyl (3-trifluoromethylphenoxy)(4-chlorophenyl)acetate.—3- trifluoromethylphenol (20.4 g., 0.125 mole) in 25 ml. of methyl alcohol is added to a solution of sodium methoxide prepared by dissolving 2.9 g. (0.125 mole) of sodium metal in 125 ml. of methyl alcohol. To this is added a solution of 31.9 g. (0.125 mole) of methyl (4-chlorophenyl)bromoacetate in 25 ml. of methyl alcohol. The reaction is heated under reflux for 15 hours and then concentrated in vacuo. Ether (500 ml.) and water (150 ml.) are added to the residue and the organic phase is separated. It is dried over sodium sulfate and evaporated to give a residue which is recrystallized from 70 ml. of methylcyclohexane. Methyl (3 - trifluoromethylphenoxy)(4 - chlorophenyl)acetate, 28.0 g. (65% yield), is obtained which melts at 86–88° C.

Step D: (3-trifluoromethylphenoxy)(4-chlorophenyl)-acetic acid.—The methyl (3-trifluoromethylphenoxy)(4-chlorophenyl)acetate from Step C is added to a solution of 18.2 g. (0.325 mole) of potassium hydroxide in 220 ml. of 90% ethanol and the mixture is heated under reflux for six hours. The solvent is evaporated in vacuo and 750 ml. of water is added. The solution is filtered and acidified with dilute sulfuric acid to yield the product in crude solid form. Recrystallization from 75 ml. of methylcyclohexane gives 23.4 g. (87.3% yield) of (3-trifluoromethylphenoxy)(4 - chlorophenyl)acetic acid melting at 99–101° C.

*Analysis.*—Calculated for $C_{15}H_{10}ClF_3O_3$ (percent): C, 54.48; H, 3.05; Cl, 10.72; F, 17.24. Found (percent): C, 54.54; H, 3.14; Cl, 10.68; F, 17.35.

EXAMPLE 2

(4-butyrylphenoxy)phenylacetic acid

Sodium metal (23 g., 1.0 mole) is dissolved in a mixture of 1000 ml. of absolute methanol and 165 g. (1.0 mole) of 4-butyrylphenol followed by the addition of 229 g. (1.0 mole) of methyl phenylbromoacetate. This mixture is heated under reflux on the steam bath for 20 hours and the excess remaining methanol is then evaporated and the residue treated with 1 liter of water. This mixture is then extracted with ethyl ether and the organic phase dried and the ether evaporated on the steam bath. The residue is taken up in boiling benzene, hexane is added until the product precipitates and the solvents are decanted away and the oily residue taken up in 500 ml. of a 10% sodium hydroxide solution. This mixture is heated on the steam bath and stirred until a clear solution is obtained. Upon acidification with hydrochloric acid, (4-butyrylphenoxy)phenylacetic acid is obtained as a white solid. The product is then recrystallized from ethyl alcohol to yield 120 g. (50%) of (4-butyrylphenoxy)phenylacetic acid, M.P. 134–136° C.

*Analysis.*—Calculated for $C_{18}H_{18}O_4$ (percent): C, 72.46; H, 6.08. Found (percent): C, 72.52; H, 6.29.

EXAMPLE 3

(4-butyrylphenoxy)(4-chlorophenyl)acetic acid

Sodium metal (11.5 g., 0.50 mole) is dissolved in 500 ml. of absolute methyl alcohol and then 82 g. (0.50 mole) of 4-butyrylphenol and 132 g. (0.50 mole) of methyl (4-chlorophenyl)bromoacetate are added and the resulting mixture heated at reflux for 20 hours. The excess methyl alcohol is evaporated in vacuo and the residue crystallized directly from a mixture of benzene and hexane. The resulting solid is taken up in 500 ml. of a 10% sodium hydroxide solution and heated on the steam bath and stirred for two hours. The solution is cooled and acidified with concentrated hydrochloric acid to obtain an oil which solidifies. The resulting mixture is filtered and the solid recrystallized from ethyl alcohol to obtain (4-butyrylphenoxy)(4-chlorophenyl)-acetic acid in the form of white plates, M.P. 61–63° C.

EXAMPLE 4

(4-trifluoromethylphenoxy)(4-chlorophenyl)acetic acid

Step A: Methyl (4-trifluoromethylphenoxy)(4-chlorophenyl)acetate.—Replacing the 3-trifluoromethylphenol reagent of Example 1, Step C, with an equivalent amount (20.4 g., 0.125 mole) of 4-trifluoromethylphenol and after heating the reaction mixture under reflux for 4.5 hours, the same isolation procedure yields an impure crystalline product. Recrystallization from hexane gives 24.6 g. (57% yield) of methyl (4-trifluoromethylphenoxy)(4-chlorophenyl)acetate which melts at 79.5–81.5° C.

Step B: (4-trifluoromethylphenoxy)(4 - chlorophenyl)-acetic acid.—The methyl (4-trifluoromethylphenoxy)(4-chlorophenyl)-acetate (13.0 g., 0.0377 mole) of Step A is dissolved in 50 ml. of glacial acetic acid and added to a mixture of 33 ml. of concentrated hydrochloric acid and 50 ml. of glacial acetic acid. The reaction mixture is heated under reflux for 75 minutes and then concentrated in vacuo. Crystallization of the residue from butyl chloride and recrystallization from methylcyclohexane gives 8.5 g. (68% yield) of (4 - trifluoromethylphenoxy)(4-chlorophenyl)acetic acid which melts at 120–121° C.

*Analysis.*—Calculated for $C_{15}H_{10}ClF_3O_3$ (percent): C, 54.48; H, 3.05. Found (percent): C, 54.77; H, 3.25.

EXAMPLE 5

(2-methylmercaptophenoxy)(4-chlorophenyl)acetic acid

To a solution of sodium methoxide prepared by dissolving 2.8 g. (0.12 mole) of sodium metal in 100 ml. of methyl alcohol there is successively added 17.0 g. (0.12 mole) of 2-methylmercaptophenol and 26.5 g. (0.10 mole) of methyl (4-chlorophenyl)bromoacetate. After heating under reflux for 16 hours, the methyl alcohol is evaporated and the residue is dissolved in 500 ml. of ether and 200 ml. of water. The ether phase is separated and evaporated and the residue is added to 100 ml. of 10% sodium hydroxide. Saponification is carried out at 100° C. for five hours and then the solution is filtered, cooled and acidified with dilute hydrochloric acid. The product is crystallized from a benzene-hexane mixture to give 5.7 g. (19% yield) of (2-methylmercaptophenoxy)(4 - chlorophenyl)acetic acid having a melting point of 132–135° C.

*Analysis.*—Calculated for $C_{15}H_{13}ClO_3S$ (percent): C, 58.34; H, 4.24; Cl, 11.48; S, 10.38. Found (percent): C, 58.28; H, 4.28; Cl, 11.62; S, 10.23.

EXAMPLE 6

(4-anilinophenoxy)(4-chlorophenyl)acetic acid 4-anilinophenol (11.1 g., 0.06 mole) and methyl (4-chlorophenyl)bromoacetate (13.2 g., 0.05 mole) are successively added to a sodium methoxide solution prepared by dissolving 1.38 g. (0.06 mole) of sodium metal in 150 ml. of methyl alcohol. The mixture is heated under reflux for 20 hours and then added to 1250 ml. of water. The methyl (4-anilinophenoxy)(4-chlorophenyl)acetate thus obtained is extracted from the aqueous solution with two 600 ml. portions of ether. The extracts are combined and washed with dilute sodium hydroxide and water and the ether is evaporated. The ester residue (15.9 g.) is dissolved in 50 ml. of n-propyl alcohol and added to 200 ml. of 10% sodium hydroxide. This mixture is heated under reflux for five hours, poured into 750 ml. of water, acidified and extracted with three 750 ml. portions of ether. Evaporation of the ether from the extracts yields a crystalline residue of (4 - anilinophenoxy)-(4-chlorophenyl)acetic acid. Recrystallization from acetonitile gives 5.0 g. (28% yield) of pure product melting at 148.5–150.5° C.

*Analysis.*—Calculated for $C_{20}H_{16}ClNO_3$ (percent): C, 67.89; H, 4.56; N, 3.96. Found (percent): C, 67.83; H, 4.50; N, 4.01.

EXAMPLE 7

(4-carboxyphenoxy)(4-chlorophenyl)acetic acid

Step A: Methyl (4-methoxycarbonylphenoxy)(4-chlorophenyl)acetate.—Sodium metal (2.3 g., 0.10 mole) is dissolved in 125 ml. of methyl alcohol and to this solution 4-methoxycarbonylphenol (15.2 g., 0.10 mole) in 50 ml. of methyl alcohol and methyl (4-chlorophenyl)bromoacetate (26.4 g., 0.10 mole) in 25 ml. of methyl alcohol are successively added. The mixture is heated under reflux for 16 hours and then the solvent is removed by evaporation in vacuo. Ether (500 ml.) and water (100 ml.) are added to the residue and, after complete solution occurs, the ether phase is separated, washed by extraction with dilute sodium hydroxide and water and the ether then evaporated under reduced pressure. The residue is crystallized from methyl alcohol to give 28.3 g. (88% yield) of methyl (4-methoxycarbonylphenoxy)(4 - chlorophenyl)-acetate melting at 85.5–88° C.

Step B: (4-carboxyphenoxy)(4 - chlorophenyl)acetic acid.—Potassium hydroxide (16.8 g., 0.3 mole) dissolved in 50 ml. of water is added to a solution of methyl (4-methoxycarbonylphenoxy)(4 - chlorophenyl)acetate (16.7 g., 0.05 mole) (from Step A) in 225 ml. of n-propyl alcohol. The mixture is heated under reflux for 16 hours and then concentrated in vacuo to remove the solvent. The residue is dissolved in water (1500 ml.), filtered and acidified with dilute hydrochloric acid. The product is extracted with two 600 ml. portions of ether. The extracts are combined and evaporated to a crystalline residue. Recrystallization from isopropyl alcohol gives 14.9 g. (93% yield) of (4-carboxyphenoxy)(4-chlorophenyl)acetic acid which melts at 232–235° C.

*Analysis.*—Calculated for $C_{15}H_{11}ClO_5$ (percent): C, 58.74; H, 3.62. Found (percent): C, 58.60; H, 3.80.

EXAMPLE 8

(3-carboxyphenoxy)(4-chlorophenyl)acetic acid

Step A: Methyl (3 - methoxycarbonylphenoxy)(4-chlorophenyl)acetate.—By replacing the 4-methoxycarbonylphenol of Example 7, Step A, with an equimolar quantity of 3-methoxycarbonylphenol (15.2 g., 0.10 mole) and then carrying out the reaction under the same conditions and with the same amounts of the other reagents named in the aforementioned example, there is obtained a 76% yield (25.1 g.) of methyl (3-methoxycarbonylphenoxy)(4-chlorophenyl)acetate which melts at 64.5–67° C.

Step B: (3-carboxyphenoxy)(4 - chlorophenyl)acetic acid.—The methyl (3 - methoxycarbonylphenoxy)(4-chlorophenyl)acetate of Step A is saponified under the same conditions and using the same relative quantities of reagents as described in Example 7, Step B. After concentration of the saponification solution, the residue is dissolved in 1500 ml. of water and filtered. Acidification with dilute hydrochloric acid yields a crystalline product that is collected, washed and dried to give 13.6 g. (85% yield) of (3-carboxyphenoxy)(4-chlorophenyl)acetic acid. Recrystallization from acetic acid yields material melting at 205–207° C.

*Analysis.*—Calculated for $C_{15}H_{11}ClO_5$ (percent): C, 58.74; H, 3.62. Found (percent): C, 58.51; H, 3.73.

EXAMPLE 9

(4-styrylphenoxy)(4-chlorophenyl)acetic acid)

Step A: Methyl (4-styrylphenoxy)(4-chlorophenyl)acetate.—Sodium metal (2.3 g., 0.10 mole) is dissolved in 500 ml. of methyl alcohol. 4-styrylphenol (19.6 g., 0.10 mole) is added, the solution is heated to reflux and 33.5 g. (0.12 mole) of methyl (4-chlorophenyl)bromoacetate is added. Heating under reflux is continued for two hours during which time a crystalline solid forms. The mixture is cooled and the product is collected by filtration. Recrystallization from ethyl acetate gives 28.0 g. (82% yield) of methyl (4-styrylphenoxy)(4-chlorophenyl)acetate which melts at 141–142° C.

Step B: (4 - styrylphenoxy)(4 - chlorophenyl)acetic acid.—Methyl (4-styrylphenoxy)(4-chlorophenyl)acetate (10 g.) is heated under reflux for two hours in 200 ml. of 5% sodium hydroxide. Sodium (4-styrylphenoxy)(4-chlorophenyl)acetate precipitates and is collected by filtration after the reaction cools. The sodium salt is washed with ethyl acetate and then stirred with 200 ml. of 10% hydrochloric acid at 50° C. for two hours. The solid is collected, washed with water, dried and recrystallized from methyl alcohol to give 7.1 g. (75% yield) of (4-styrylphenoxy)(4-chlorophenyl)acetic acid which melts at 190–192° C.

Analysis.—Calculated for $C_{22}H_{17}ClO_3$ (percent): C, 72.43; H, 4.70; Cl, 9.72. Found (percent): C, 72.09; H, 4.67; Cl, 9.83.

EXAMPLE 10

(3-trifluoromethylphenoxy)(2,4-dichlorophenyl) acetic acid

Step A: Methyl (2,4-dichlorophenyl)bromoacetate.—A mixture of 2,4-dichlorophenylacetic acid (41 g., 0.2 mole) and thionyl chloride (30 g., 0.25 mole) is stirred and heated under reflux for two hours. Bromine (32 g., 0.2 mole) is added over a three-hour period while continuing the stirring and reflux. The reaction mixture is heated under reflux for 20 hours and then cooled to room temperature. Methyl alcohol (200 ml.) is slowly added and after the vigorous reaction subsides, the excess alcohol is removed under reduced pressure. The residual oil is dissolved in ether (400 ml.) and the solution is washed by water extraction. The ether solution is concentrated and the oily product distilled in vacuo (7 mm.). Methyl (2,4-dichlorophenyl)bromoacetate ($n_D^{25}$ 1.5742) is collected at its boiling point of 141–143° C.

Step B: Methyl (3-trifluoromethylphenoxy)(2,4-dichlorophenyl)acetate.—Sodium metal (2.3 g., 0.10 mole) is dissolved in 300 ml. of methyl alcohol and to this solution is added 16.2 g. (0.10 mole) of 3-trifluoromethylphenol in 25 ml. of methyl alcohol and 29.8 g. (0.10 mole) of methyl (2,4-dichlorophenyl)bromoacetate in 25 ml. of methyl alcohol. The mixture is heated under reflux for 16 hours and then the solvent is evaporated in vacuo. Ether (500 ml.) and water (100 ml.) are added to the residue and the ether phase is separated. It is washed by extraction with dilute potassium hydroxide and water and then the ether is evaporated. The liquid residue is distilled in vacuo to give 21.1 g. (56% yield) of methyl (3-trifluoromethylphenoxy)(2,4-dichlorophenyl)acetate boiling at 162–166° C. at 0.8 mm.; $n_D^{25}$ 1.5319.

Step C: (3-trifluoromethylphenoxy)(2,4-dichlorophenyl)acetate acid.—Methyl (3 - trifluoromethylphenoxy)(2,4-dichlorophenyl)acetate (16.0 g., 0.042 mole) is dissolved in 135 ml. of ethyl alcohol and added to a solution of 9.5 g. (0.17 mole) of potassium hydroxide in 15 ml. of water. The reaction mixture is heated under reflux for six hours and then the solvent is removed in vacuo. The residue is dissolved in 700 ml. of water and the solution is filtered. The filtrate is acidified with dilute hydrochloric acid and the product is extracted with ether. Evaporation of the ether and crystallization of the residue from butyl chloride gives 10.4 g. (68% yield) of (3-trifluoromethylphenoxy)(2,4-dichlorophenyl)acetic acid which melts at 105.5–107.5° C.

Analysis.—Calculated for $C_{15}H_9Cl_2F_3O_3$ (percent): C, 49.34; H, 2.48. Found (percent): C, 49.44; H, 2.73.

EXAMPLE 11

(3-trifluoromethylphenoxy)(4-chlorophenyl)acetamide

A solution of (3-trifluoromethylphenoxy)(4-chlorophenyl)acetyl chloride (9.0 g., 0.0258 mole) in 20 ml. of dioxane is added over a 20-minute period to a well-stirred solution of concentrated ammonium hydroxide (5.4 ml., 0.1 mole) in 300 ml. of dioxane. During the addition, the temperature is maintained at 15–20° C. with a cooling bath. After the addition of acid chloride is completed, the reaction mixture is stirred for two hours at ambient temperature and then the dioxane solvent is removed by evaporation in vacuo. Ether (200 ml.) and water (200 ml.) are added to the residue and the resulting two liquid phases are separated. The ether solution then is extracted with dilute potassium hydroxide solution and with water and the ether evaporated in vacuo to yield 7.0 g. of (3-trifluoromethylphenoxy)(4-chlorophenyl)acetamide as a solid residue, M.P. 119–125° C. Recrystallization of the product from isopropyl alcohol yields purified (3-trifluoromethylphenoxy)(4-chlorophenyl)acetamide which melts at 123–125° C.

Analysis.—Calculated for $C_{15}H_{11}ClF_3NO_2$ (percent): C, 54.64; H, 3.36; N, 4.25. Found (percent): C, 54.62; H, 3.47; N, 4.28.

EXAMPLE 12

N,N-dimethyl(3-trifluoromethylphenoxy) (4-chlorophenyl)acetamide

By substituting an equivalent amount of a 25% aqueous solution of dimethylamine for the concentrated ammonium hydroxide solution of Example 11 and following the procedure described therein, a solid product having a melting point of 105–111° C. is obtained. Recrystallization from isopropyl alcohol yields pure N,N-dimethyl(3-trifluoromethylphenoxy)(4 - chlorophenyl)acetamide, M.P. 114–116° C.

Analysis.—Calculated for $C_{17}H_{15}ClF_3NO_2$ (percent): C, 57.07; H, 4.23; N, 3.92. Found (percent): C, 57.08; H, 4.44; N, 3.89.

EXAMPLE 13

N-methyl(3-trifluoromethylphenoxy) (4-chlorophenyl)acetamide

By substituting an equivalent amount of a 40% aqueous solution of methylamine for the concentrated ammonium hydroxide solution of Example 11 and following the procedure described therein, a crystalline product identified as N-methyl(3-trifluoromethylphenoxy)(4-chlorophenyl)acetamide is obtained. Recrystallization from n-butyl chloride yields pure crystalline N-methyl(3-trifluoromethylphenoxy)(4 - chlorophenyl)acetamide, M.P. 94–96° C.

Analysis.—Calculated for $C_{16}H_{13}ClF_3NO_2$ (percent): C, 55.90; H, 3.81; N, 4.08. Found (percent): C, 56.25; H, 3.78; N, 4.06.

EXAMPLE 14

N-hydroxy(3-trifluoromethylphenoxy) (4-chlorophenyl)acetamide

A mixture of ether (75 ml.), hydroxylamine hydrochloride (3.54 g., 0.05 mole) and anhydrous sodium carbonate (5.3 g., 0.05 mole) is cooled to 3° C. and (3-trifluoromethylphenoxy)(4-chlorophenyl)acetyl chloride (17.7 g., 0.05 mole) in 25 ml. of ether is added with stirring over a 5-minute period. Water (15 ml.) is then added with stirring at 3–7° C. over a 15-minute interval, the mixture is stirred for two hours at room temperature and the resulting layers are separated. The ether solution then is washed with water, dried over sodium sulfate and evaporated. The crystalline residue (15.7 g.) thus obtained has a melting point of 90–102° C. Recrystallization from n-butyl chloride yields pure N-hydroxy(3-trifluoromethylphenoxy)(4-chlorophenyl)acetamide, M.P. 117–119° C.

Analysis.—Calculated for $C_{15}H_{11}ClF_3NO_3$ (percent): C, 52.11; H, 3.21; N, 4.05. Found (percent): C, 51.81; H, 3.23; N, 3.86.

EXAMPLE 15

Ethyl (3-trifluoromethylphenoxy)(4-chlorophenyl)acetate

Boron trifluoride etherate (20 ml.) is added to a solution of (3 - trifluoromethylphenoxy)(4 - chlorophenyl) acetic acid (19.99 g., 0.06 mole) in ethyl alcohol (100 ml.) and the mixture is heated under reflux for one hour. Ethyl alcohol is then removed by evaporation under reduced pressure and ether (250 ml.) and ice water (300 ml.) are added to the residue. The layers are separated and the ether solution is extracted with dilute potassium bicarbonate solution and then with water. After evaporation of the ether from the ether solution, the oily residue is distilled at 136–140° C. at 0.2 mm. to yield 18.1 g. of ethyl (3-trifluoromethylphenoxy)(4-chlorophenyl)acetate ($n_D^{25}$ 1.5150).

*Analysis.*—Calculated for $C_{17}H_{14}ClF_3O_3$ (percent): C, 56.91; H, 3.93. Found (percent): C, 57.00; H, 4.19.

EXAMPLE 16 d-(3-trifluoromethylphenoxy)(4-chlorophenyl)acetic acid

Step A: d-(3-trifluoromethylphenoxy)(4-chlorophenyl)acetic acid, cinchonidine salt.—dl-(3-trifluoromethylphenoxy)(4-chlorophenyl)acetic acid (100 g., 0.303 mole) and cinchonidine alkaloid (89.3 g., 0.303 mole) are added to 2000 ml. of isopropyl alcohol at room temperature. Crystallization of the salt begins in a few minutes. The temperature is then raised to reflux (83° C.) and the mixture is cooled ambiently to 55° C. whereupon it is aged for two hours. The crystalline material which results is collected, washed with 200 ml. of hot isopropyl alcohol and dried to yield 110 g. of crude cinchonidine salt, M.P. 204–206° C. (The mother liquor thus obtained is used in Example 17, Step A, for the preparation of 1 - (3 - trifluoromethoxypenoxy)(4-chlorophenyl)acetic acid.) The crude cinchonidine salt is slurried with 2000 ml. of ethyl alcohol and 400 ml. of methyl alcohol at reflux and then stirred and cooled ambiently overnight. After collection by filtration and washing with 200 ml. of ethyl alcohol, the product is air-dried at 60° C. to a constant weight of 69.2 g., M.P. (dec.) 213–214° C., $[\alpha]_D$ —30.2° (c.=0.5 in methyl alcohol). Recrystallization of 58 g. from 1800 ml. of ethyl alcohol yields 43.1 g. of pure d-(3-trifluoromethylphenoxy)(4-chlorophenyl)acetic acid, cinchonidine salt, M.P. (dec.) 216–217° C., $[\alpha]_D$ —29.8° (c.=0.5 in methyl alcohol).

Step B: d-(3-trifluoromethylphenoxy)(4-chlorophenyl)acetic acid.—The d - (3 - trifluoromethylpenoxy)(4-chlorophenyl)acetic acid, cinchonidine salt (7.1 g.) of Step A is added to a mixture of 200 ml. of ether, 200 ml. of water and 4 ml. of concentrated sulfuric acid. The layers are separated and the ether solution is washed three times with 200 ml. of water. After drying, the ether solution is evaporated and the oil is crystallized from 25 ml. of methylcyclohexane to yield 2.95 g. of d-(3-trifluoromethylphenoxy)(4-chlorophenyl)acetic acid, M.P. 98–100.5° C., $[\alpha]_D$ +95.3° (c.=0.5 in methyl alcohol).

EXAMPLE 17 l-(3-trifluoromethylphenoxy)(4-chlorophenyl) acetic acid

Step A: 1-(3-trifluoromethylphenoxy)(4-chlorophenyl)acetic acid, cinchonidine salt.—The mother liquor from the crude d-(3-trifluoromethylphenoxy)(4-chlorophenyl)acetic acid, cinchonidine salt isolated in Example 16, Step A, is heated to effect complete solution and then cooled ambiently. The small amount of solid which is present at 30° C. is removed by filtration, the clear filtrate is stirred at room temperature overnight and the crystalline precipitate thus obtained is collected by filtration and washed with 200 ml. of isopropyl alcohol to yield 58.8 g. of l-(3-trifluoromethylphenoxy)(4-chlorophenyl)acetic acid, cinchonidine salt, M.P. (dec.) 200–201° C., $[\alpha]_D$ —94.7° (c.=0.5 in methyl alcohol). The product (43.8 g.) is recrystallized from isopropyl alcohol (800 ml.) to give 37.3 g. of pure l-(3-trifluoromethylphenoxy)(4 - chlorophenyl)acetic acid, cinchonidine salt, M.P. (dec.) 200.5–201.5° C., $[\alpha]_D$ —95.5° (c.=0.5 in methyl alcohol).

Step B: 1-(3-trifluoromethylphenoxy)(4-chlorophenyl)acetic acid.—Pure 1-(3-trifluoromethylphenoxy)(4-chlorophenyl)acetic acid, cinchonidine salt (5.9 g.) from Step A is converted in essentially the same manner as described in Step B for the corresponding d-acid, to pure 1-(3-trifluoromethylphenoxy)(4-chlorophenyl)acetic acid, 2.7 g., M.P. 98–100° C., $[\alpha]_D$ —99° (c.=0.5 in methyl alcohol).

EXAMPLE 18

Sodium (3-trifluoromethylphenoxy)(4-chlorophenyl)acetate

A mixture of (3-trifluoromethylphenoxy)(4-chlorophenyl)acetic acid (31.7 g., 0.11 mole), isopropyl alcohol (100 ml.) and sodium methoxide (5.4 g., 0.10 mole) is stirred and the white solid which forms is collected by filtration and dried. There is thus obtained 5.9 g. (76%) of sodium (3-trifluoromethylphenoxy)(4-chlorophenyl) acetate.

EXAMPLE 19

Basic aluminum bis-(3-trifluoromethylphenoxy)(4-chlorophenyl)acetate

Sodium (3 - trifluoromethylphenoxy)(4 - chlorophenyl) acetate (20.0 g., 0.0568 mole) is dissolved in 100 ml. of hot water and to the solution is added aluminum chloride hexahydrate (6.85 g., 0.0284 mole) in 25 ml. of water at a temperature of 85–100° C. The mixture is then cooled rapidly and the granular product thus formed is collected by filtration and dried to yield 18.6 g. (93%) of basic aluminum bis-(3-trifluoromethylphenoxy)(4-chlorophenyl)acetate.

*Analysis.*—Calculated for $C_{30}H_{19}AlCl_2F_6O_7$ (percent): C, 52.85; H, 3.07; Al, 2.74; Cl, 10.47. Found (percent): C, 51.23; H, 2.72; Al, 3.84; Cl, 10.08.

In a manner similar to that described in Example 5 for the preparation of (2 - methylmercaptophenoxy)(4-chlorophenyl)acetic acid all of the products of this invention may be obtained. Thus, by substituting the appropriate phenolate and methyl phenyl-haloacetate for the 2-methylmercaptophenol and methyl (4-chlorophenyl)bromoacetate of Example 5 and following substantially the procedure described therein, all of the (phenoxy)phenylacetic acids (I) of this invention may be obtained. The following equation illustrates the reaction of Example 5 and, together with Table I (infra), depict the sodium phenolate (derived from the corresponding phenol and sodium methoxide) and methyl phenylhaloacetate (IIa, infra) starting materials of the instant process and the corresponding products (Ia, infra) derived therefrom:

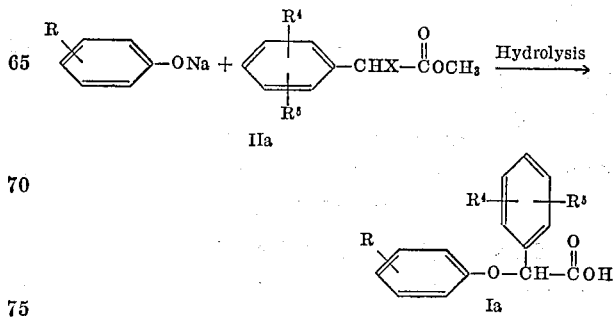

TABLE I

| Ex. | R | R⁴ | R⁵ | X |
|---|---|---|---|---|
| 20 | 4-NH₂ | H | 4-CH₃ | Cl |
| 21 | 4-SCH₃ | H | 4-OCH₃ | Br |
| 22 | 2-COOH | H | 4-COCH₃ | Cl |
| 23 | 4-NHC₂H₅ | H | 4-COOH | Cl |
| 24 | 4-CH₂—C₆H₅ | H | 4-Br | Br |
| 25 | 4-O—C₆H₅ | 2-Cl | 4-Cl | Br |
| 26 | 4-O—CH₂—C₆H₅ | H | 4-SO₂CH₃ | Br |
| 27 | 2-SO₂CH₃ | H | 4-Cl | Br |
| 28 | 4-CN | H | H | Br |
| 29 | 2-NO | 2-COCH₃ | H | Cl |
| 30 | 3-N(CH₃)₂ | H | H | Br |
| 31 | 4-C₆H₅ | H | 4-CH₃ | Cl |
| 32 | 3-CF₃ | H | 4-OCH₂—C₆H₅ | Br |
| 33 | 4-COCH₂—CH₃ | H | 4-O—C₆H₅ | Br |
| 34 | 4-COOH | H | 4-C₆H₅ | Cl |
| 35 | 4-SCH₃ | 2-COOH | H | Cl |
| 36 | 4-COCH₃ | H | 4-CH₂—C₆H₅ | Cl |
| 37 | 2-NH₂ | H | H | Br |
| 38 | 4-SO₂CH₃ | 2-OCH₂—C₆H₅ | H | Cl |
| 39 | 4-CH₂Cl | H | 4-CH₂Cl | Br |
| 40 | 4-O—C₆H₅ | H | H | Br |
| 41 | 4-S—C₆H₅ | 2-CN | H | Br |
| 42 | 2-CH₂—CH=CH₂ | H | H | Br |
| 43 | 3-CF₃ | H | 4-Cl | Cl |

The products of the invention can be administered in a wide variety of therapeutic dosages in conventional vehicles as, for example, by oral administration in the form of a capsule or tablet as well as by intravenous injection. Also, the dosage of the products may be varied over a wide range as, for example, in the form of capsules or scored tablets containing 5, 10, 20, 25, 50, 100, 150, 250 and 500 milligrams, i.e., from 5 to about 500 milligrams, of the active ingredient for the symptomatic adjustment of the dosage to the patient to be treated. These dosages are well below the toxic or lethal dose of the products.

A suitable unit dosage form of the products of this invention can be prepared by mixing 100 mg. of a (phenoxy)-phenylacetic acid or a suitable salt, lower alkyl ester, amide, lower alkylamide, di-lower alkylamide, hydroxyamide or heterocyclic amide derivative thereof, with 94 mg. of lactose and 6 mg. of magnesium stearate, and placing the 200 mg. mixture into a No. 3 gelatin capsule. Similarly, by employing more of the active ingredient and less lactose, other dosage forms can be put up in No. 3 gelatin capsules and, should it be necessary to mix more than 200 mg. of ingredients together, larger capsules may be employed. Compressed tablets, pills or other desired unit dosages can be prepared to incorporate the compounds of this invention by conventional methods and, if desired, can be made up as elixirs or as injectable solutions by methods well known to pharmacists.

It is also within the scope of this invention to combine two or more of the compounds of this invention in a unit dosage form or to combine one or more of the compounds with other known hypocholesterolemics or with other desired therapeutic and/or nutritive agents in dosage unit form.

The following example is included to illustrate the preparation of a representative dosage form:

EXAMPLE 44

Dry-filled capsules containing 100 mg. of active ingredient per capsule

|   | Per capsule (mg.) |
|---|---|
| (3-trifluoromethylphenoxy)-(4-chlorophenyl) acetic acid | 100 |
| Lactose | 94 |
| Magnesium stearate | 6 |
| Capsule size No. 3 | 200 |

The (3 - trifluoromethylphenoxy) (4 - chlorophenyl) acetic acid is reduced to a No. 60 powder and then lactose and magnesium stearate are passed through a No. 60 bolting cloth onto the powder and the combined ingredients admixed for 10 minutes and then filled into No. 3 dry gelatin capsules.

Similar dry-filled capsules can be prepared by replacing the active ingredient of the above example by any of the other novel compounds of this invention.

It will be apparent from the foregoing description that the (phenoxy)phenylacetic acid products of this invention and their salt, ester and amide derivatives constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:

1. A compound having the formula:

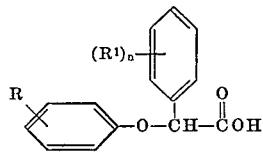

wherein R is lower alkenyl, halomethyl, trihalomethyl, lower alkanoyl, mononuclear aryl, mononuclear aralkyl, mononuclear aralkenyl, mononuclear aryloxy, mononuclear aralkoxy, mononuclear arylthio, mononuclear arylamino, carboxy, lower alkylthio, lower alkylsulfonyl, cyano, nitroso, amino, monoalkylamino or dialkylamino; $R^1$ represents similar or dissimilar members selected from hydrogen, halogen, lower alkyl, halomethyl, lower alkoxy, lower alkanoyl, mononuclear aryl, mononuclear aralkyl, mononuclear aryloxy, mononuclear aralkoxy, cyano, carboxy and lower alkylsulfonyl; and $n$ is an integer having a value of 1–2; and the nontoxic, pharmacologically acceptable salts, lower alkyl ester and amide, monoalkylamide, dialkylamide, hydroxyamide, pyrrolidide, piperidide and morpholide derivatives thereof.

2. A compound having the formula:

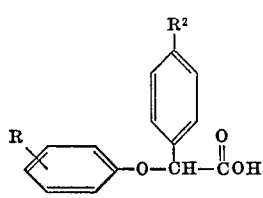

wherein R is trifluoromethyl and $R^2$ is halogen; and the non-toxic, pharmacologically acceptable salts, lower alkyl ester and amide, monoalkylamide, dialkylamide and hydroxyamide derivatives thereof.

3. The product of claim 1 wherein R is trihalomethyl, $R^1$ is halogen and $n$ is 1; and the nontoxic, pharmacologically acceptable salts thereof.

4. The product of claim 2 wherein $R^2$ is chloro.

5. The product of claim 1 wherein R is trihalomethyl, $R^1$ is halogen and $n$ is 2.

6. The product of claim 1 wherein R is lower alkanoyl, $R^1$ is halogen and $n$ is 1.

7. The product of claim 1 wherein R is lower alkylthio and $R^1$ is hydrogen.

8. The product of claim 1 wherein R is lower alkenyl; $R^1$ is halogen and $n$ is 1.

9. The product of claim 1 wherein R is carboxy, $R^1$ is halogen and $n$ is 1.

10. (3 - trifluoromethylphenoxy) (4 - chlorophenyl) acetic acid.

11. Ethyl (3 - trifluoromethylphenoxy) (4 - chloro phenyl)-acetate.

12. d-(3 - trifluoromethylphenoxy) (4 - chlorophenyl) acetic acid.

13. 1-(3 - trifluoromethylphenoxy) (4 - chlorophenyl) acetic acid.

14. Sodium (3 - trifluoromethylphenoxy) (4 - chlorophenyl)-acetate.

References Cited

UNITED STATES PATENTS 3,106,564    10/1963    Fleming et al. _____ 260—5590

OTHER REFERENCES

Mamaev et al.: Chem. Abstr. 47: 12287 (1953).

LORRAINE A. WEINBERGER, Primary Examiner

D. E. STENZEL, Assistant Examiner

U.S. Cl. X.R.

260—247.1, 247.7, 284, 293.4, 294.7, 326.5, 448, 465, 470, 471, 516, 519, 520, 559; 424—308, 317, 324